(12) United States Patent
Pi

(10) Patent No.: US 9,268,388 B2
(45) Date of Patent: Feb. 23, 2016

(54) POWER SAVING METHOD

(71) Applicants: Inventec Appliances (Pudong) Corporation, Shanghai (CN); Inventec Appliances Corp., New Taipei (TW); Inventec Appliances (Shanghai) Co. Ltd., Shanghai (CN)

(72) Inventor: Ben-Yuan Pi, Shanghai (CN)

(73) Assignees: INVENTEC APPLIANCES (PUDONG) CORPORATION, Shanghai (CN); INVENTEC APPLIANCES CORP., New Taipei (TW); INVENTEC APPLIANCES (SHANGHAI) CO. LTD., Shanghai (CN)

( * ) Notice: Subject to any disclaimer, the term of this patent is extended or adjusted under 35 U.S.C. 154(b) by 286 days.

(21) Appl. No.: 13/948,469

(22) Filed: Jul. 23, 2013

(65) Prior Publication Data

US 2014/0043262 A1 Feb. 13, 2014

(30) Foreign Application Priority Data

Aug. 9, 2012 (CN) .......................... 2012 1 0282868

(51) Int. Cl.
G06F 3/041 (2006.01)
G06F 1/32 (2006.01)
G09G 5/10 (2006.01)
G06F 3/0488 (2013.01)

(52) U.S. Cl.
CPC ............ G06F 1/3218 (2013.01); G06F 1/3265 (2013.01); G06F 3/0488 (2013.01); G09G 5/10 (2013.01); *G09G 2330/021* (2013.01); *Y02B 60/1242* (2013.01)

(58) Field of Classification Search
None
See application file for complete search history.

(56) References Cited

U.S. PATENT DOCUMENTS

| | | | |
|---|---|---|---|
| 2008/0238880 A1* | 10/2008 | Miwa | 345/173 |
| 2010/0194705 A1* | 8/2010 | Kim et al. | 345/173 |
| 2011/0037576 A1* | 2/2011 | Jeon | G06F 1/1626 340/407.2 |
| 2011/0063276 A1* | 3/2011 | Tan et al. | 345/212 |
| 2011/0069089 A1* | 3/2011 | Kopf et al. | 345/690 |

* cited by examiner

*Primary Examiner* — Adam R Giesy
(74) *Attorney, Agent, or Firm* — Tim Tingkang Xia, Esq.; Locke Lord LLP

(57) ABSTRACT

A power saving method is provided. The power saving method is applicable to an electronic device including a display unit. The method comprises the steps of determining a start point on the display unit, determining whether the start point is located in a bright area of the display unit, receiving a signal corresponding to an end point on the display unit, generating a trigger signal according to the start point and the end point, and darkening the brightness of an area between the start point and the end point on the display unit according to the trigger signal.

12 Claims, 15 Drawing Sheets

POWER SAVING METHOD

CROSS-REFERENCE TO RELATED APPLICATIONS

This non-provisional application claims priority under 35 U.S.C. §119(a) on Patent Application No. 201210282868.6 filed in P.R. China on Aug. 9, 2012, the entire contents of which are hereby incorporated by reference.

FIELD OF THE INVENTION

The present invention relates to a power saving method, and more particularly relates to a power saving method capable of freely adjusting the displaying area.

BACKGROUND OF THE INVENTION

Portable electronic devices in the market, such as handheld electronic devices, usually adopt batteries as the power source. Usage time (i.e. the time your battery will run before it must be recharged) and standby time are the important considerations when buying a portable electronic device. Thus, all the manufacturers have considered extension of usage time and standby time as an important issue for the development of portable electronic devices.

Attending with the development and wide spreading of telecommunication technologies, social distance between people is dramatically reduced. In the fast-paced modern society, for the purposed of catching the instant information against time, the handheld electronic devices with multi-function, such as personal digital assistant (PDA), module phone, and etc., came out in the market to execute various information, e.g. voice, text message, video and word processing, in a limited time period simultaneously. It is noted that other than the trend of slimmer, smaller, and lighter to make the handheld electronic device easy to carry and improved the overall performance, it is also an important topic to extend the usage time and standby time of the handheld portable device without connecting to a power source.

Generally, the most power-consuming condition for the handheld electronic device, other than the specific function such as talking on the phone, should be the usage of the display to show the information. In order to reduce the unnecessary power-consumption, how to control the power supply for the display, especially when the handheld electronic device is standby, is an important topic. However, on/off of the display in the traditional handheld electronic device is controlled by a specific switching button or by setting a timing module with a predetermined time period. The switching button, which occupies some of the already limited space within the handheld electronic device, may enhance the cost of mechanical design and elements. In addition, it is troublesome for the user to remember touching the switching button every time when he wants to enable the power-saving function. On the other hand, when the timing module is used, the user cannot freely control the on/off condition of the display, which makes the operation less convenient.

BRIEF SUMMARY OF INVENTION

It is an object of the present invention to provide a power saving method which is helpful for simplifying mechanical design and reducing cost.

The power saving method provided in the present invention is applicable to an electronic device including a display unit. The method comprises the steps of: determining a start point on the display unit; determining whether the start point is located in a bright area of the display unit; receiving a signal corresponding to an end point on the display unit; generating a trigger signal according to the start point and the end point; and darkening the brightness of an area between the start point and the end point on the display unit according to the trigger signal.

In accordance with an embodiment of the present invention, the electronic device further includes an operating unit, and the method further comprises: generating the signal corresponding to the end point by the operating unit.

In accordance with an embodiment of the present invention, the signal corresponding to the end point is generated according to a cursor which is shown on the display and controlled by a keypad.

In accordance with an embodiment of the present invention, the electronic device includes an operating unit, which includes a touch panel, and the method further comprises: generating the signal corresponding to the end point by the touch panel.

In accordance with an embodiment of the present invention, the signal corresponding to the end point is generated by utilizing a selecting module, the trigger signal is generated according to a touch trace from the start point to the end point, and the step of generating the trigger signal according to the touch trace from the start point to the end point further comprises: detecting a movement of the selecting module on the touch panel to generate a trace signal by using a touch trace detecting module.

In accordance with an embodiment of the present invention, the area between the start point and the end point on the display unit is darken according to the trigger signal when the start point is located in the bright area of the display unit, and the bright area is formed between the start point and the end point on the display unit according to the trigger signal when the start point is not located in the bright area of the display unit.

In accordance with an embodiment of the present invention, the power saving method further comprises: accessing a start point coordinate value of the start point; defining a start horizontal line according to the start point coordinate value; accessing an end point coordinate value of the end point; defining an end horizontal line according to the end point coordinate value; darkening the area between the start horizontal line and the end horizontal line on the display unit.

In accordance with an embodiment of the present invention, the operating unit includes a touch panel, and the signal corresponding to the end point is generated when an enclosed region is slid on the touch panel by utilizing a selecting module, and the step of generating the trigger signal according to the start point and the end point comprises: generating the trigger signal according to a touch trace of the enclosed region. The step of generating the trigger signal according to the touch trace of the enclosed region further comprises: detecting a movement of the selecting module on the touch panel to generate a trace signal by using a touch trace detecting module. When the start point is not located in the bright area of the display unit, the method further comprises: selecting a second enclosed region by using the selecting module to slide on the touch panel; generating a second trigger signal according to a touch trace of the second enclosed region; and brightening the brightness of the second enclosed region according to the second trigger signal.

In contrast with the prior art, the power saving method provided in the present invention allows the user to choose the area to be displayed (the bright area) on the touch panel directly. The user can operate on the touch panel over the display directly to define the starting point, the end point, or an enclosed region, then the processor is capable to adjust the brightness of the selected area so as to achieve the object of power saving. In addition, without the need to operate by using a mechanical button, the operation is more convenient and the mechanical design of the handheld electronic device thus can be simplified.

DETAILED DESCRIPTION OF THE INVENTION

The embodiments adopted in the present invention would be further discussed by using the flowing paragraph and the figures for a better understanding.

Figure 1A:
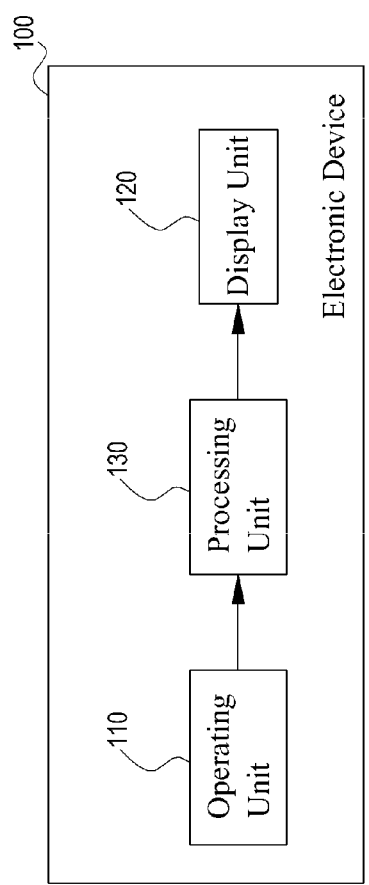
FIG. 1A is a block diagram showing an electronic device which is capable to adopt the power saving method of the present invention.
Figure 1B:
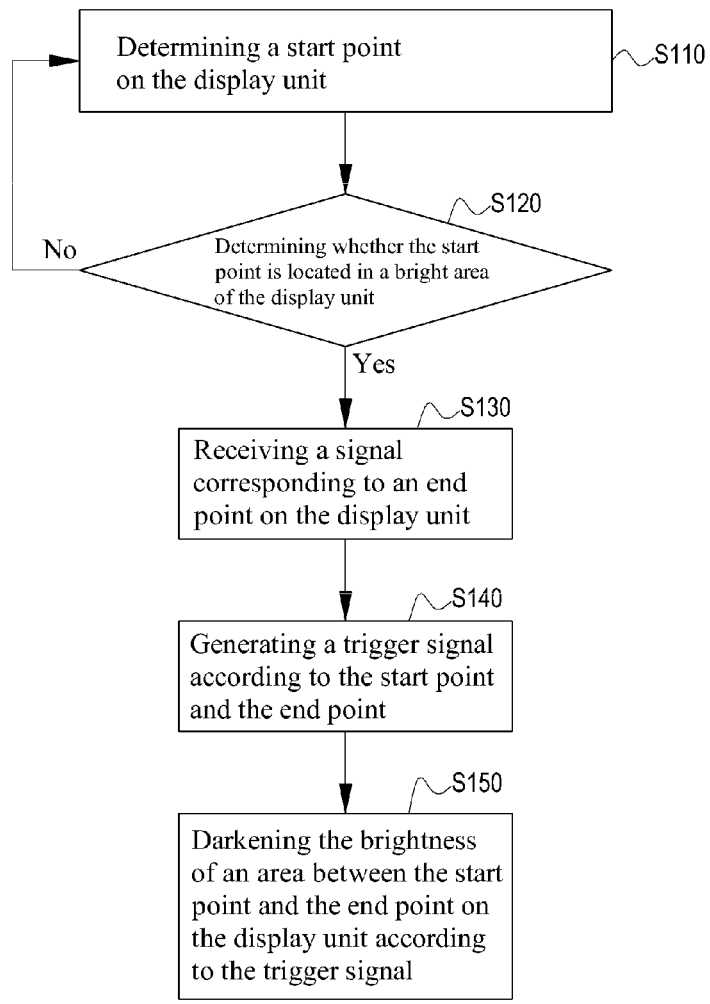
FIG. 1B is a flowchart showing the power saving method in accordance with a first embodiment of the present invention.

FIG. 1A is a block diagram showing an electronic device which is capable to adopt the power saving method of the present invention. FIG. 1B is a flowchart showing the power saving method in accordance with a first embodiment of the present invention. Referring to both FIG. 1A and FIG. 1B, the electronic device includes at least an operating unit 110, a display unit 120, and a processing unit 130. The present invention is capable of selectively showing merely the area the user wants to see through controlling the backlight module of the display unit. In the present embodiment, such controlling method is carried out by darkening the brightness of a portion of the bright area. However, it is understood by those skilled that the present invention should not be so restricted.

In step S110, a start point is determined on the display unit 120 by using the operating unit 110. Then, in step S120, the processing unit 130 determines whether the start point is located in a bright area of the display unit 120. If so, the process moves to the following step S130, and if not, the process backs to the step S110. In S130, the processing unit 130 receives a signal corresponding to an end point on the display unit 120. The end point may be selected by using the operating unit 110. Then, in step S140, a trigger signal is generated according to the start point and the end point, and in the following step S150, the processing unit 130 darkens the brightness of an area between the start point and the end point on the display unit 120 according to the trigger signal As a preferred embodiment, the signal corresponding to the start point may be generated according to a cursor which is shown on the display and controlled by a keypad.

As a preferred embodiment, the signal corresponding to the end point may be generated according to a cursor which is shown on the display and controlled by a keypad.

Figure 2:
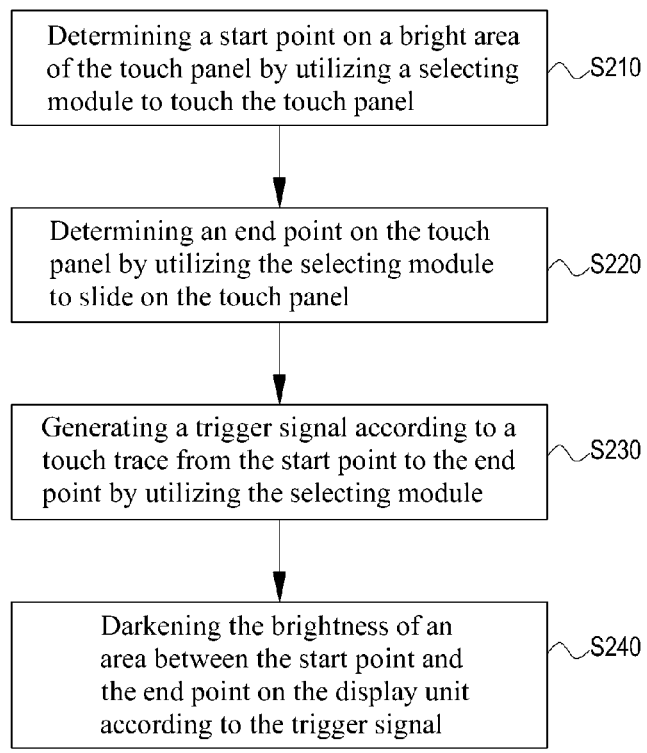
FIG. 2 is a flowchart showing a power saving method in accordance with a second embodiment of the present invention.
Figure 3A:
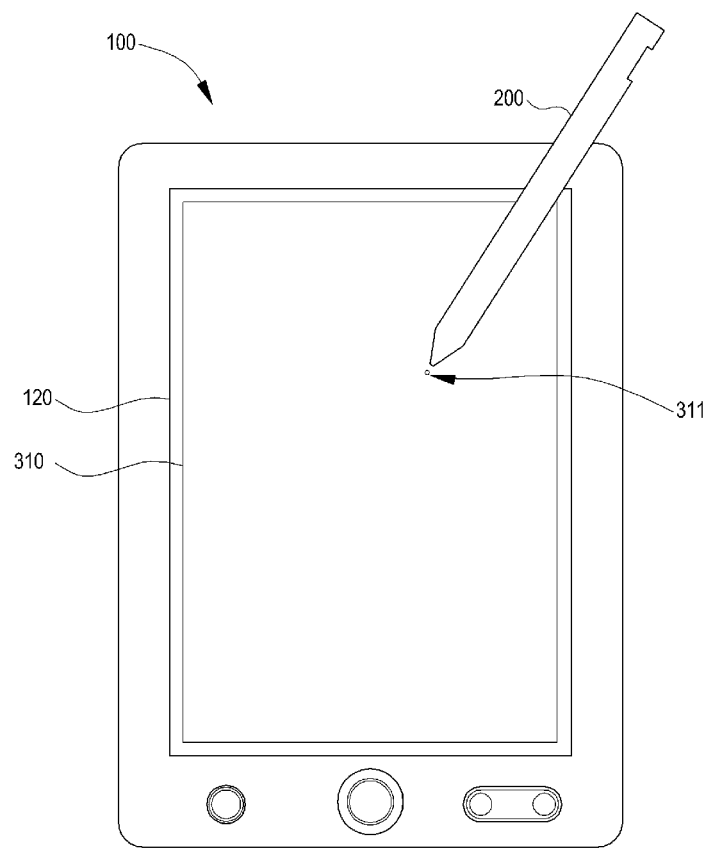
FIG. 3A is a schematic view showing the step of determining a start point on a bright area of the display unit in accordance with the second embodiment of the present invention.
Figure 3B:
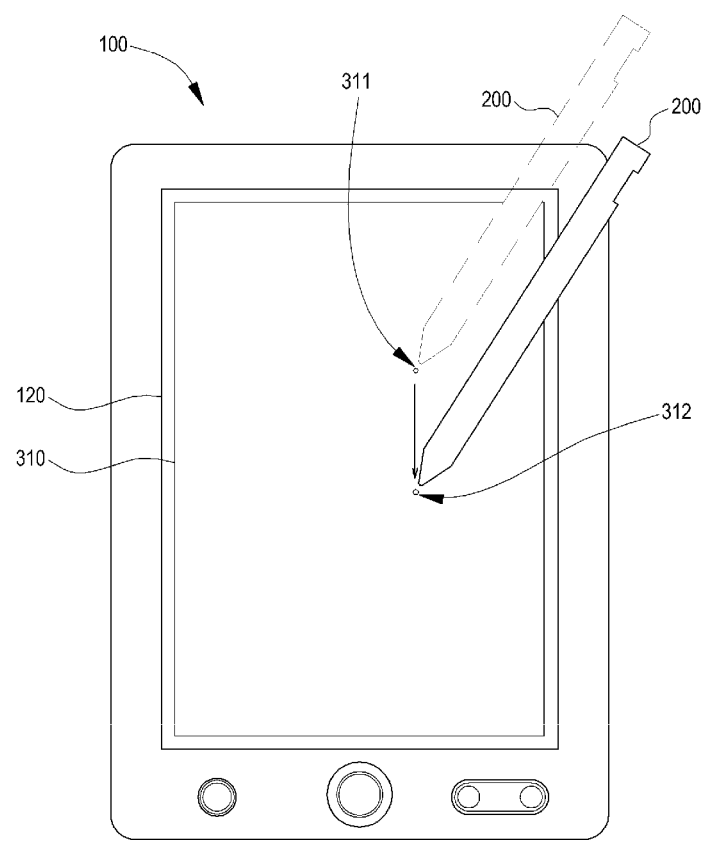
FIG. 3B is a schematic view showing the step of determining an end point by using the selecting module to slide on the touch panel in accordance with the second embodiment of the present invention.
Figure 3C:
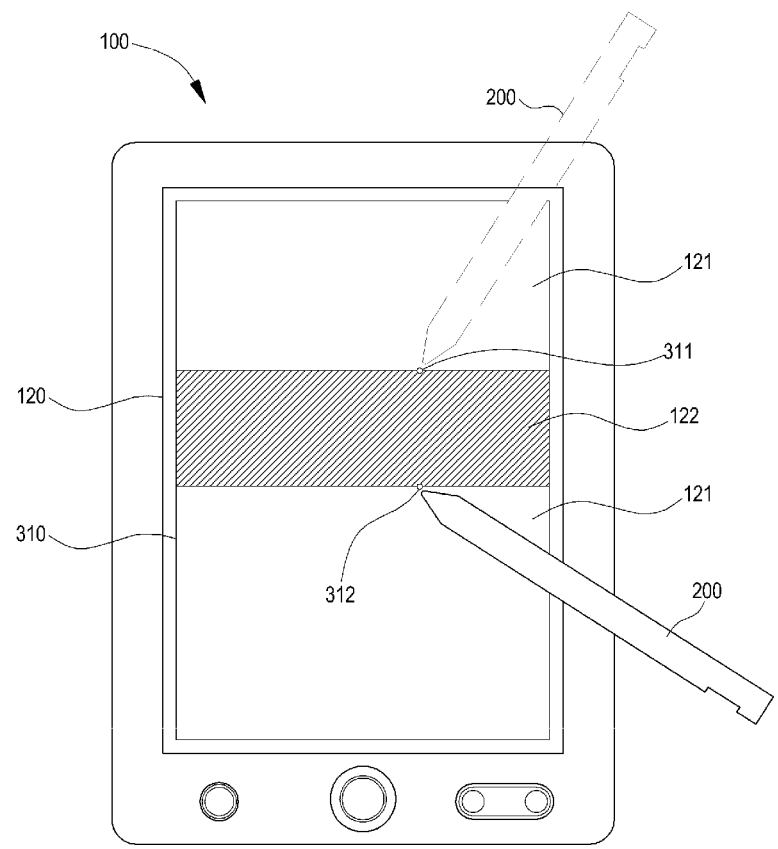
FIG. 3C is a schematic view showing the step of darkening the brightness of an area between the start point and the end point on the display unit in accordance with the second embodiment of the present invention.
Figure 3D:
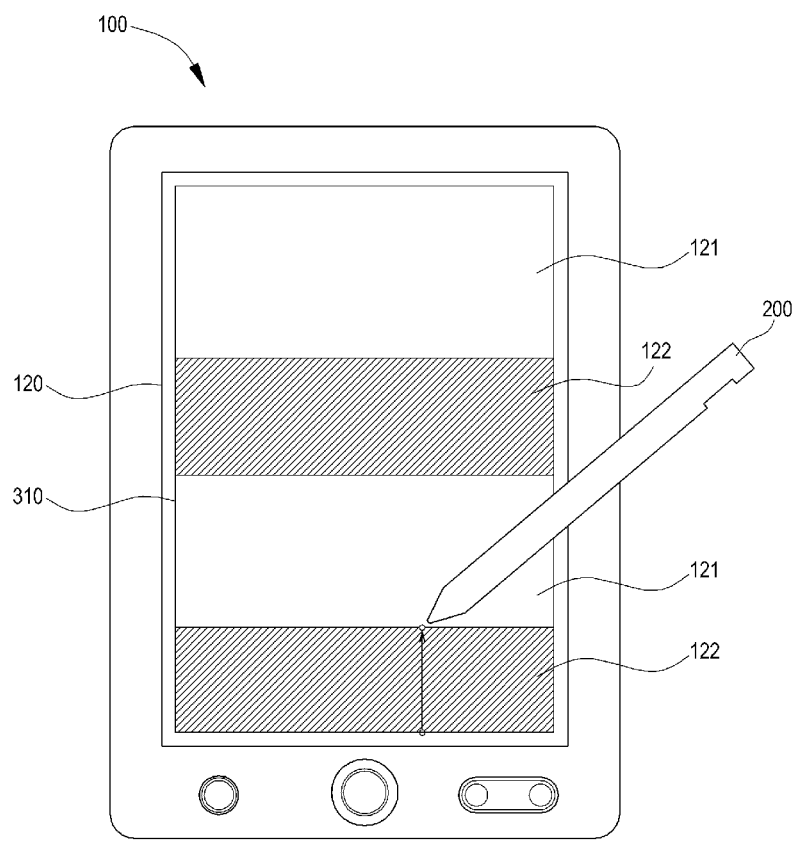
FIG. 3D is a schematic view showing the display unit with multiple darkened areas in accordance with the second embodiment of the present invention.

Please refer to both FIGS. 2, 3A, 3B, 3C, and 3D. FIG. 2 is a flowchart showing the power saving method in accordance with a second embodiment of the present invention. FIG. 3A is a schematic view showing the step of determining a start point on a bright area of the display unit in accordance with the second embodiment of the present invention. FIG. 3B is a schematic view showing the step of determining an end point by using the selecting module to slide on the touch panel in accordance with the second embodiment of the present invention. FIG. 3C is a schematic view showing the step of darkening the brightness of an area between the start point and the end point on the display unit in accordance with the second embodiment of the present invention. FIG. 3D is a schematic view showing the display unit with multiple darkened areas in accordance with the present embodiment of the present invention.

As shown in FIG. 2, the power saving method in accordance with the second embodiment of the present invention has the feature of darkening the brightness of a portion of the bright area and the method comprises the steps as below. The corresponded elements and labels can be referred to FIGS. 3A to 3D.

In step S210, as shown in FIG. 3A, a start point 311 is determined on a bright area of the touch panel 310, which is also the bright area of the display unit, by utilizing a selecting module, such as a touch pen 200, to touch the touch panel 310.

In step S220, as shown in FIG. 3B, an end point 312 is determined on the touch panel 312 by utilizing the selecting module (the touch pen 200) to slide on the touch panel 310.

In step S230, a trigger signal is generated according to a touch trace from the start point 311 to the end point 312 by utilizing the selecting module (the touch pen 200). As a preferred embodiment, a touch trace detecting module may be utilized for detecting a movement of the selecting module (the touch pen 200) on the touch panel 310 to generate a trace signal, and the trigger signal is generated according to the trace signal.

In step S240, as shown in FIG. 3C, the brightness of an area between the start point 311 and the end point 312 on the display unit 120 is darkened (transformed from a bright area 121 to a dark area 122) according to the trigger signal.

In the present embodiment, the number of dark area 122 on the display unit 120 can be more than one. A plurality of dark areas 122 can be formed on the display unit 120 as shown in FIG. 3D through repeating the above mentioned steps.

As a preferred embodiment, the step of darkening the area between the start point and the end point is carried out by using the following steps.

Firstly, a start point coordinate value of the start point is accessed.

Next, a start horizontal line is defined according to the start point coordinate value.

Then, an end point coordinate value of the end point is accessed.

Next, an end horizontal line is defined according to the end point coordinate value;

Finally, the area between the start horizontal line and the end horizontal line on the display unit is darkened.

Figure 4:
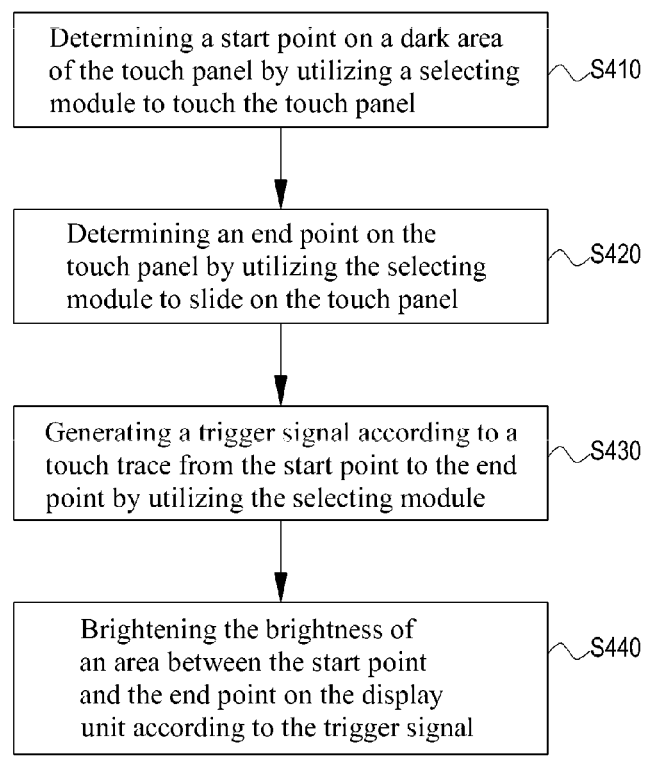
FIG. 4 is a flowchart showing a power saving method in accordance with a third embodiment of the present invention.
Figure 5A:
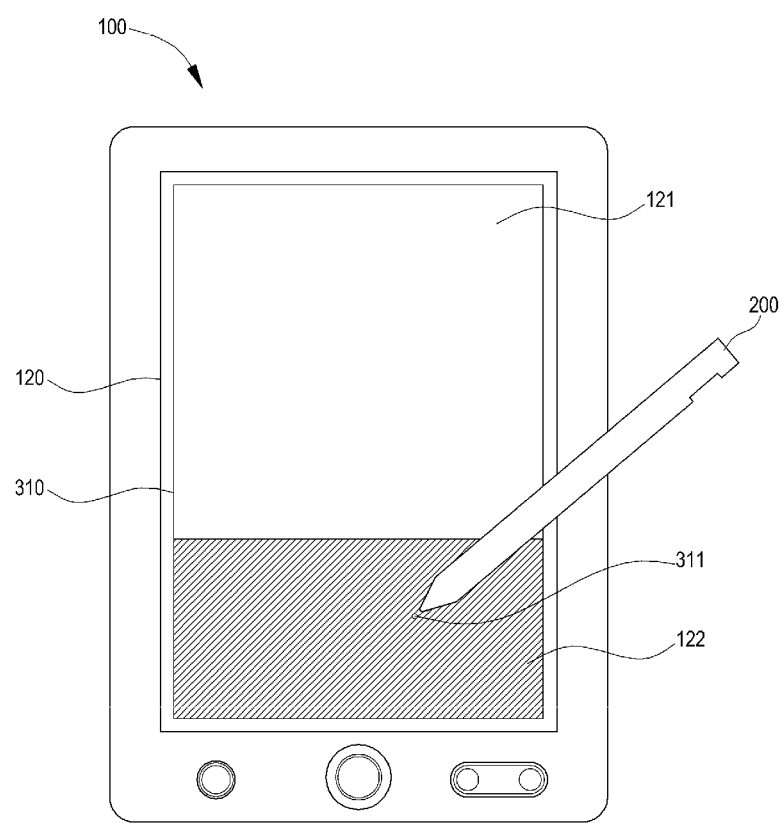
FIG. 5A is a schematic view showing the step of determining a start point on a dark area of the display unit in accordance with the third embodiment of the present invention.
Figure 5B:
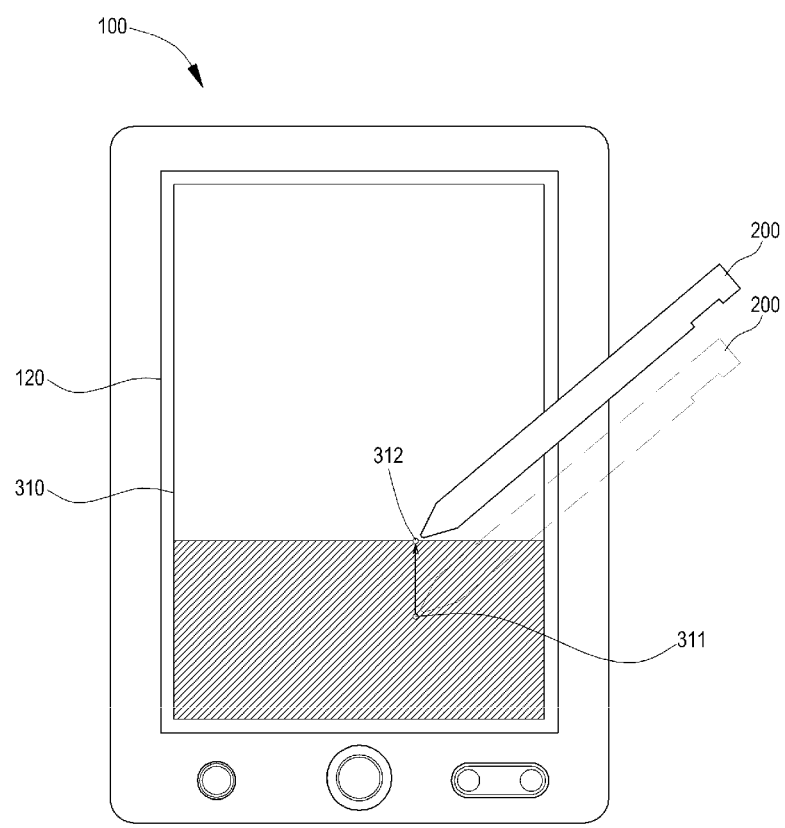
FIG. 5B is a schematic view showing the step of determining an end point by using the selecting module to slide on the touch panel in accordance with the third embodiment of the present invention.
Figure 5C:
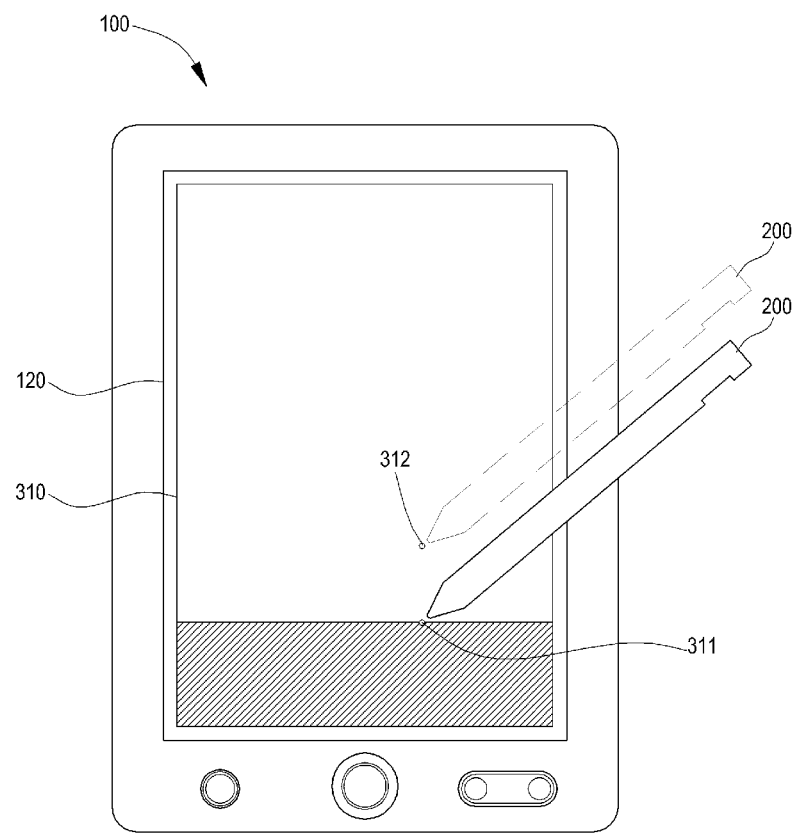
FIG. 5C is a schematic view showing the step of brightening the brightness of an area between the start point and the end point on the display unit in accordance with the third embodiment of the present invention.

Other than the above mentioned embodiment, which turns the bright area of the display unit into the dark area, in accordance with another embodiment of the present invention, the present invention is also capable to turn the dark area into the bright area. Please refer to both FIGS. 4, 5A, 5B, and 5C, wherein FIG. 4 is a flowchart showing the power saving method in accordance with a third embodiment of the present invention and it describes the method as the start point is located in the dark area of the display unit. Firstly, as shown in FIG. 5A, in step S410, a start point 311 is determined on a dark area of the touch panel 310 by utilizing a selecting module, such as a touch pen 200, to touch the touch panel 310. Then, as shown in FIG. 5B, in step S420, an end point 312 is determined on the touch panel 310 by utilizing the selecting module (the touch pen 200) to slide on the touch panel 310. Afterward, in step S430, a trigger signal is generated according to a touch trace from the start point 311 to the end point 312 by utilizing the selecting module (the touch pen 200). Finally, as shown in FIG. 5C, in step S440, the brightness of an area between the start point 311 and the end point 312 on the display unit 120 is brightened (transformed from the dark area 112 into the bright area 111) according to the trigger signal.

Figure 6:
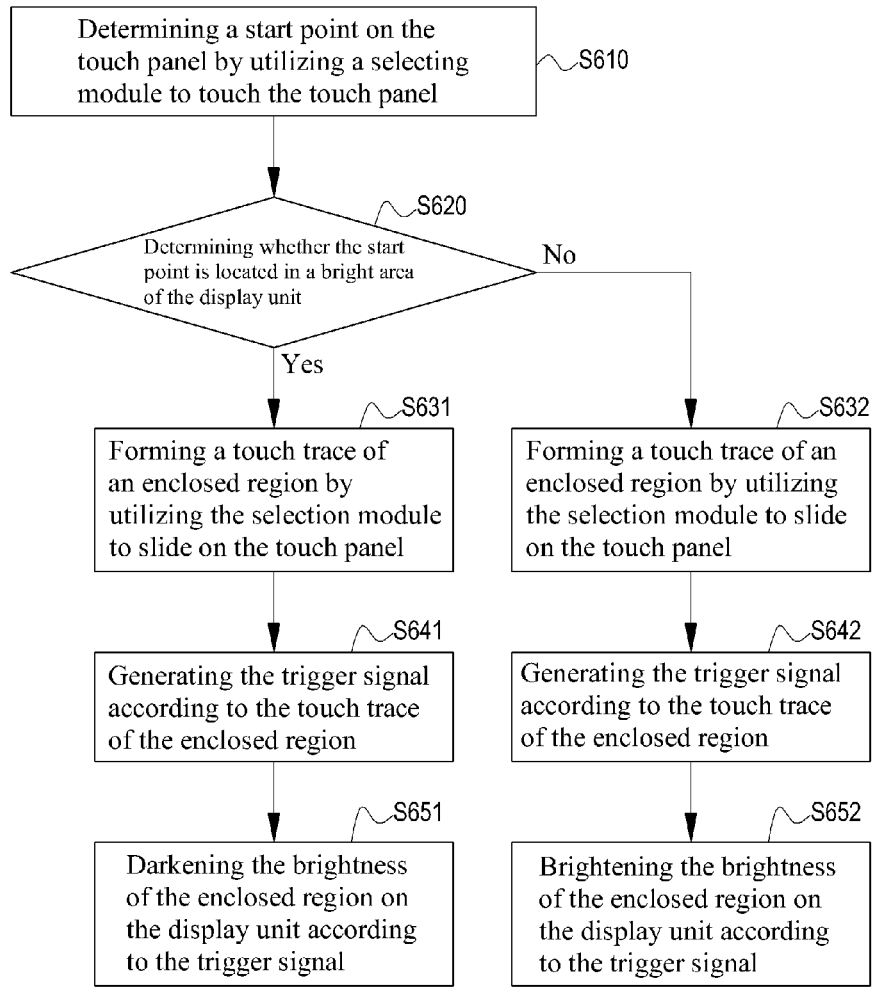
FIG. 6 is a flowchart showing a power saving method in accordance with a fourth embodiment of the present invention.
Figure 7A:
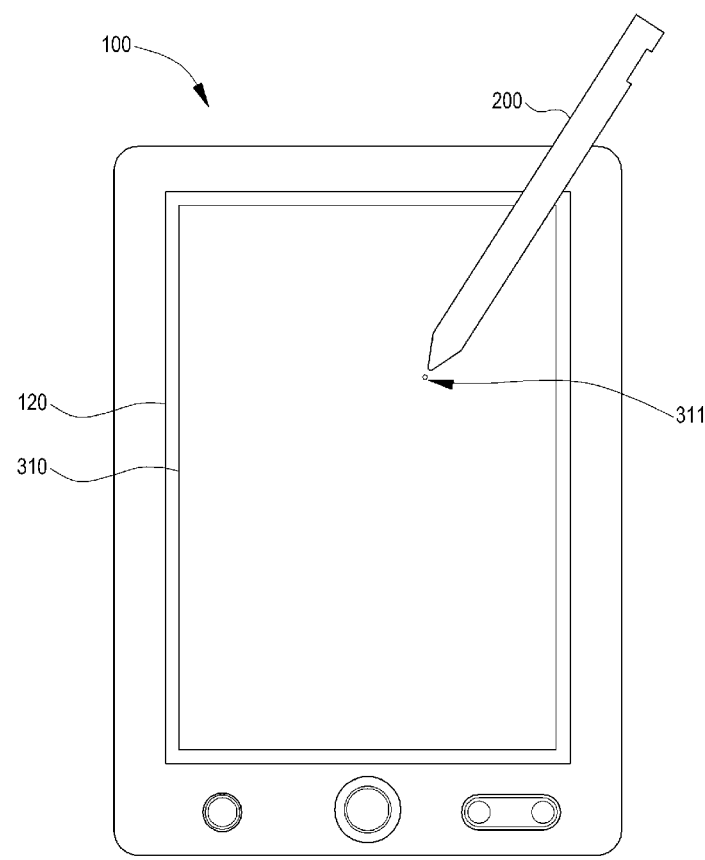
FIG. 7A is a schematic view showing the step of determining a start point on a bright area of the display unit in accordance with the fourth embodiment of the present invention.
Figure 7B:
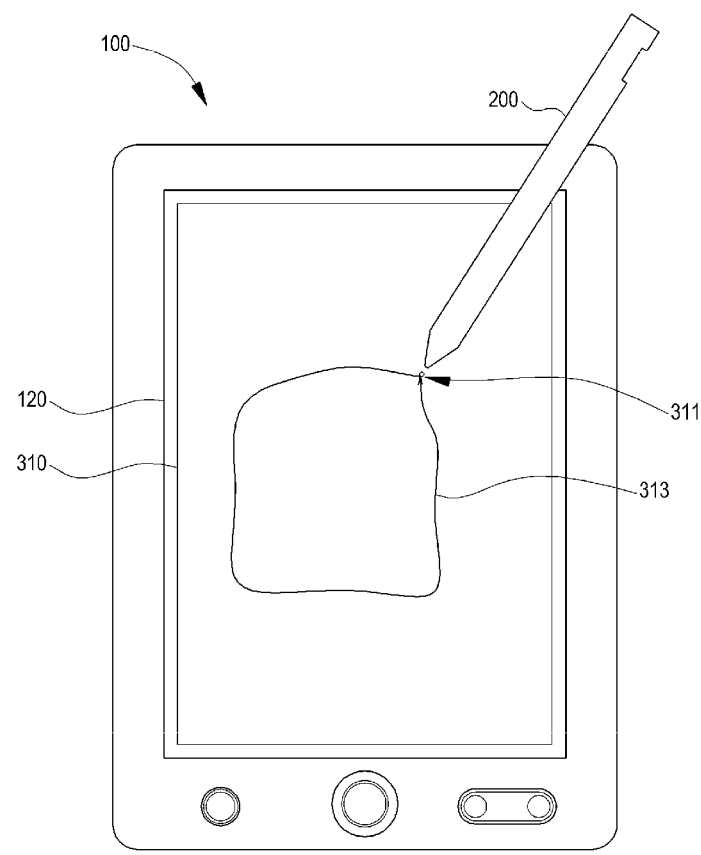
FIG. 7B is a schematic view showing the step of forming a touch trace of an enclosed region by utilizing the selection module to slide on the touch panel in accordance with the fourth embodiment of the present invention.
Figure 7C:
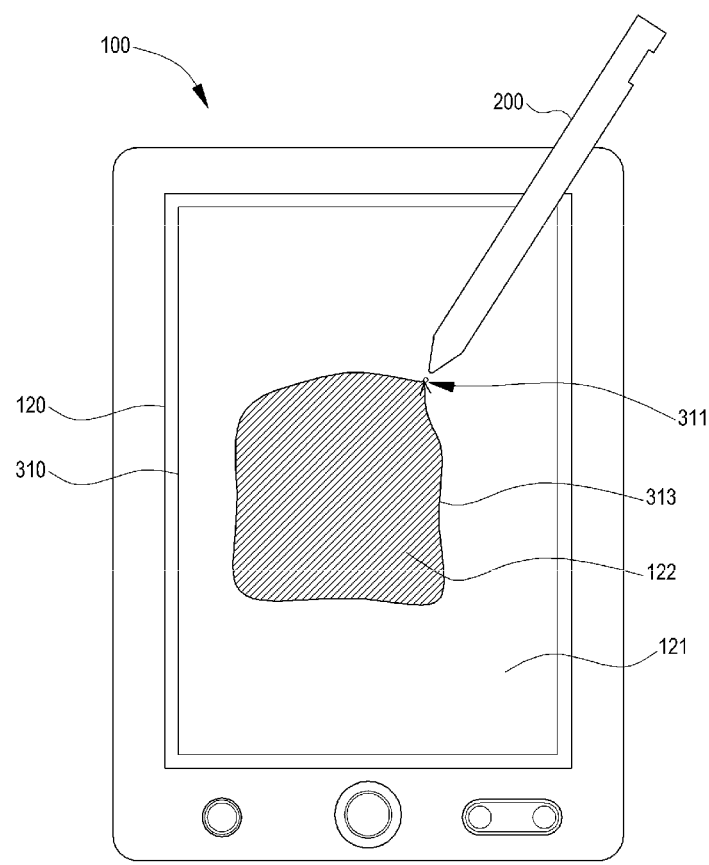
FIG. 7C is a schematic view showing the step of darkening the brightness of the enclosed region on the display unit in accordance with the fourth embodiment of the present invention.

Please refer to FIGS. 6, 7A, 7B, and 7C, wherein FIG. 6 is a flowchart showing the power saving method in accordance with the fourth embodiment of the present invention, which controls the brightness of an enclosed region on the display unit, and FIGS. 7A to 7C are schematic views showing the selected enclosed region on the display unit transformed from the bright area into the dark area.

In step S610 and also referring to FIG. 7A, a start point 311 is determined on the touch panel 310 by utilizing a selecting module, such as the touch pen 200, to touch the touch panel 310.

Then, in step S620, the processing unit determines whether the start point 311 is located in a bright area of the display unit 120. If so, the process moves to step S631, and if not, the process moves to step S632.

In step S631 and also referring to FIG. 7B, a touch trace of an enclosed region 313 is formed by utilizing the selection module (the touch pen 200) to slide on the touch panel 310.

In step S632 and also referring to FIG. 7B, a touch trace of an enclosed region 313 is formed by utilizing the selection module (the touch pen 200) to slide on the touch panel 310.

Step 641 follows step S631. In step S641, the trigger signal is generated according to the touch trace of the enclosed region 313.

Step 642 follows step 632. In step S642, the trigger signal is generated according to the touch trace of the enclosed region 313.

According to the description of steps S631, S632, S641, and S642, the trigger signal can be generated according to the touch trace of an enclosed region no matter the start point is located in a bright area or a dark area.

If the start point in located in the bright area, as shown in FIG. 7C, in step S651, the brightness of the enclosed region on the display unit is darkened according to the trigger signal If the start point is located in the dark area, in step S652, the brightness of the enclosed region on the display unit is brightened according to the trigger signal.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A power saving method, applicable to an electronic device including a display unit, and the method comprising:
   determining a start point on the display unit, and accessing a start point coordinate value of the start point;
   defining a start horizontal line according to the start point coordinate value;
   determining whether the start point is located in a bright area of the display unit;
   receiving a signal corresponding to an end point on the display unit, and accessing an end point coordinate value of the end point;
   defining an end horizontal line according to the end point coordinate value;
   generating a trigger signal according to the start point and the end point; and
   darkening the brightness of an area between the start horizontal line and the end horizontal line on the display unit according to the trigger signal, thereby saving power of the electronic device.

2. The power saving method of claim 1, wherein the electronic device further includes an operating unit, and the method further comprising:
   generating the signal corresponding to the end point by the operating unit.

3. The power saving method of claim 2, wherein the signal corresponding to the end point is generated according to a cursor which is shown on the display and controlled by a keypad.

4. The power saving method of claim 2, wherein the operating unit includes a touch panel, and the method further comprising:
   generating the signal corresponding to the end point by the touch panel.

5. The power saving method of claim 4, wherein the signal corresponding to the end point is generated by utilizing a selecting module, and the trigger signal is generated according to a touch trace from the start point to the end point.

6. The power saving method of claim 5, wherein the step of generating the trigger signal according to the touch trace from the start point to the end point further comprises:

detecting a movement of the selecting module on the touch panel to generate a trace signal by using a touch trace detecting module.

7. The power saving method of claim 1, further comprising:

if the start point is located in a bright area of the display unit, darkening the area between the start horizontal line and the end horizontal line on the display unit according to the trigger signal; and if the start point is located in a dark area of the display unit, brightening the area between the start horizontal line and the end horizontal line on the display unit.

8. An electronic device operable to save power, the electronic device comprising:

a display unit configured to display at least one area varying in brightness, the display unit comprising a plurality of points located on the display unit;

an operating unit configured to generate a trigger signal according to a determination of a start point and an end point on the display unit;

a processing unit configured to:

access a start point coordinate value of the start point and define a start horizontal line according to the start point coordinate value; and access an end point coordinate value of the end point and define an end horizontal line according to the end point coordinate value, wherein the processing unit is further configured to instruct the display unit to darken the brightness of an area on the display unit defined between the start horizontal line and the end horizontal line according to the trigger signal, thereby saving power of the electronic device.

9. The electronic device of claim 8, wherein the determination of the start and end points uses a cursor shown on the display unit and controlled by a keypad.

10. The electronic device of claim 8, wherein the operating unit is a touch panel and the start and end points are determined by contacts on the touch panel.

11. The electronic device of claim 10, further including a selecting module operable to contact the touch panel and generate a touch trace from the start point to the end point, wherein the trigger signal is generated according to the touch trace.

12. The electronic device of claim 11, further including a trace detecting module configured to generate the trace signal according to a detection of the touch trace movement of the selecting module on the touch panel.

* * * * *